3,681,264
BILGE CLEANER COMPOSITION
Gerard Prial, 4055 New York Ave., Island Park, N.Y. 11558, and Chester J. Pigulski, 143—51 110th Ave., Jamaica, N.Y. 11435
No Drawing. Filed Jan. 8, 1971, Ser. No. 105,104
Int. Cl. C11d 3/066
U.S. Cl. 252—526  5 Claims

ABSTRACT OF THE DISCLOSURE

A composition which is particularly useful as a bilge cleaner and as an oil slick dispersant is comprised of an aqueous solution of from about 5 to 7 percent by weight of a mixture of alkylolamide alkyl aryl sulfonate and monobutylbiphenyl sodium monosulfonate and of from about 1.5 to 3.0 percent by weight of tetrasodium pyrophosphate.

BACKGROUND OF THE INVENTION

This invention pertains to compositions used to clean and to remove oil and/or other organic residue from bilges of boats and vessels and to compositions used to disperse oil slicks on water.

It is periodically necessary to clean the bilges of vessels due to the collection of stagnant and dirty water therein. Often combustible liquids such as oil, gasoline or diesel fuel collects in the bilge thereby creating a fire hazard and possibly an explosion hazard due to the confined volume of air and combustible material.

One problem heretofore experienced in cleaning bilges is that bilges contain many inaccessible places, hence making conventional scrubbing difficult. After attempt is made to clean the bilge by these prior art methods, the oil remaining in the bilge gives a head start toward reestablishing the conditions that necessitated cleaning the bilge.

Often liquid cleaners were used in the prior art; however, several serious drawbacks existed. First, many of the cleaners left an oil film in the bilge. Secondly, when the dirty bilge water is released into the sea, oil slicks are created. These oil slicks have caused ecology change by the loss of fish and water fowl as well as have disrupted the scenic beauty of beaches. Some prior art cleaners dispersed the oil slick when the bilge water was released; however, they were ineffectiveness in maintaining the dispersion and the oil slick later reappeared.

A further problem with the prior art cleaners is that they did not prevent corrosion of the bilge or the metal fastenings of the boat. In fact, some cleaners actually enhanced corrosion. Other materials of construction, such as Styrofoam, are now being used in boats. If the bilge cleaner is not effective, these materials will be subjected to the deleterious action of oil or gasoline and the like.

Consideration should not only be given to the effectiveness of a bilge cleaner but also its effect upon the environment. Some heavy duty surfactants found in cleaners are non-biodegradable and hence create a greater pollution problem than they are used to solve. Inorganic builders such as sodium tripolyphosphate are used in large quantities to make some cleaners effective. This high concentration of phosphate, often reaching 50 percent by weight of the cleaner, can be a nutrient for algae growth under certain conditions.

SUMMARY OF THE INVENTION

It has been found by the present invention that an aqueous composition comprised of from about 5 to 7 percent by weight of a mixture of alkylolamide alkyl aryl sulfonate and monobutylbiphenyl sodium monosulfonate and from about 1.5 to 3.0 percent by weight tetrasodium pyrophosphate can be used as a bilge cleaner or an oil slick dispersant. This novel composition in combination with sea water has been found to thoroughly remove oil and oil film from inaccessible places in the interior of a bilge only aided by the normal bobbing and rolling action of the vessel. When the bilge water is released, the oil is dispersed and is maintained dispersed. The composition of this invention was found to provide protection from corrosion and other deleterious action to not only the bilge and metal fastenings used in the construction of the vessel but also to modern materials of construction such as Styrofoam. Another advantage of the present invention is its ability to reduce the fire and explosion hazard created by the presence of oil or gasoline in the bilge by maintaining sufficient amount of the cleaner in the bilge to disperse the oil or gasoline and reduce its vapor pressure. The novel composition can also be used to extinglish oil fires on water.

It has also been found that the composition of this invention can be used to disperse oil slicks which often are caused by spilage from off-shore oil wells and tankers. When oil slicks are treated with the composition of the present invention, the oil slick is dispersed so as to be invisible and does not later reappear. After treatment, the oil is rendered harmless to fish, waterfowl, and plant life.

DETAILED DESCRIPTION OF THE INVENTION

The alkylolamide alkyl aryl sulfonate component of the composition of this invention in combination with monobutylbiphenyl sodium monosulfonate has been found to be a particularly effective surfactant for use in cleaning bilges. In most instances the water in the bilge will be saline or at least be classified as hard water. The operativeness of the composition of this invention in such usually adverse conditions for many surfactants is quite good. Another advantage of the surfactant system of this invention is its low foaming properties. One of the purposes of this invention is to maintain the scenic beauty of bodies of water; this objective could not be reached if excessive foaming occurred with the use of the present invention.

The term alkylolamide alkyl aryl sulfonate refers to compounds represented by the general formula:

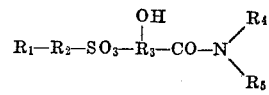

where:

$R_1$ is a linear alkyl group of from about 9 to 18 carbon atoms and preferably from about 12 to 14 carbon atoms;

$R_2$ is an aryl group which is preferably benzene or naphthalene;

$R_3$ is an alkyl group of from about 1 to 6 carbon atoms and preferably from 1 to 3 carbon atoms, and $R_4$ and $R_5$ are hydrogen or methyl groups.

Examples of the alkylolamide alkyl aryl sulfonates used in this invention are known in the art and are referred to as methanolamide dodecyl benzene sulfonate, ethanolamide dodecyl benzene sulfonate, propanolamide dodecyl benzene sulfonate, methanolamide tridecyl benzene sulfonate, ethanolamide tridecyl benzene sulfonate, propanolamide tridecyl benzene sulfonate, methanolamide tetradecyl benzene sulfonate, ethanolamide tetradecyl benzene sulfonate, and propanolamide tetradecyl benzene sulfonate. Mixtures of the alkylolamide alkyl aryl sulfonates are operable in this invention. Most commercial alkylolamide alkyl aryl sulfonates are normally obtained as mixtures due to the prohibitive cost of isolating one compound and the selected isomer of that compound.

The monobutylbiphenyl sodium monosulfonate can be represented by the following formula:

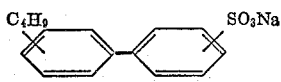

The normal isomer of the butyl radical is preferred. Various isomers of the biphenyl radical can be used. Examples are 3-(2'-butyl)biphenyl sodium sulfonate, 3-(3'-butyl) biphenyl sodium sulfonate, 3-(4'-butyl)biphenyl sulfonate, 3 - (5'-butyl)biphenyl sodium sulfonate, 3-(6'-butyl)biphenyl sodium sulfonate, 4-(2'-butyl)biphenyl sodium sulfonate, 4-(3'-butyl)biphenyl sodium sulfonate, 4-(4'-butyl)biphenyl sulfonate, 4-(5'-butyl)biphenyl sodium sulfonate, 4-(6'-butyl)biphenyl sodium sulfonate, 5-(2'-butyl)biphenyl sodium sulfonate, 5-(3'-butyl)biphenyl sodium sulfonate, 5(4'-butyl)biphenyl sulfonate, 5-(5'-butyl) biphenyl sodium sulfonate, 5-(6'-butyl)biphenyl sodium sulfonate.

The mixture of alkylolamide alkyl aryl sulfonate and monobutylbiphenyl sodium monosulfonate as total sulfonate can vary from about 5 to 7 percent by weight of the bilge cleaning composition of this invention. Preferably from about 5.8 to 6.0 percent by weight total sulfonate is used. The alkylolamide alkyl aryl sulfonate component comprises from about 20 to 90 percent by weight of the total sulfonate and preferably from about 40 to 70 percent by weight.

Tetrasodium pyrophosphate is found to be an effective detergent builder, that is, an additive which improves the cleaning power of a detergent type composition. A builder not only performs the function of a sequestering agent but also it is an acid neutralizer, a pH control agent, a peptizer for soil particles, and an emulsifier. Because of the complex function of the builder, it is imperative that a particular builder be selected for a particular purpose to obtain a synergistic formula. The properties, both physical and chemical, of tetrasodium pyrophosphate have been found to be particularly advantageous when used in the composition of this invention. First, the tetrasodium pyrophosphate (TSPP) is highly soluble in water thereby allowing the composition of this invention to be in liquid form, which for example facilitates spraying operations.

It has been found that an amount of TSPP ranging from about 1.5 to 3.0 and preferably from 1.5 to 2.5 percent by weight of the composition is desirable. The low ratio of builder to sulfonate of approximately 0.2 to 0.6/1 compares quite favorably to the common ratio of 2 to 2.5/1 for heavy duty synthetic detergents. Tetrapotassium pyrophosphate is also operable in this invention.

The sulfonate and TSPP are contained in an aqueous solution comprising the remainder of the composition of this invention. Satisfactory results have been obtained using well water having from 0.01 to 0.1 percent by weight calcium and from 0.01 to 0.05 percent by weight iron.

The following examples are illustrative of this invention and are not in limitation thereof.

The following example describes a typical composition of this invention.

EXAMPLE 1

| | Percent |
|---|---|
| Sulfonate (ethanolamine dodecyl benzene sulfonate and monobutylbiphenyl sodium monosulfonate | 5.87 |
| Tetrasodium pyrophosphate | 2.08 |
| Water | 92.05 |

EXAMPLE 2

The composition of Example 1 was used to extinguish a fire. A mixture of 2 ounces of oil and 1 ounce of gasoline was placed in a pail containing 10 quarts of water, and then the mixture was ignited. One ounce of the composition described in Example 1 was added to seven ounces of water and then added to the ignited oil and gasoline mixture. The flame was extinguished.

The utility of the bilge cleaner to prevent corrosion and other deleterious action is described in the following two examples:

EXAMPLE 3

(A) The composition described in Example 1 was placed in a dish container.

The metal fastenings were placed in the container and were stirred until they were completely coated by the solution. Portions of the fastenings were exposed to the air. After two weeks the fastenings were inspected and showed no signs of corrosion.

(B) As a control, similar metal fastenings were placed in a dish containing a detergent composition consisting of 15% by weight of dodecyl benzene sulfonate, 40% by weight sodium tripolyphosphate, and 45% by weight of water. These metal fastenings were also stirred until they were completely coated by the solution. Portions of the fastenings were exposed to the air. After two weeks the metal fastenings were inspected and showed considerable surface corrosion.

(C) Some of the metal fastenings were taken from the dish containing the formula solution (Example 1) and put into the dish containing the detergent solution. Inspection two weeks later showed no signs of corrosion on these metal fastenings.

EXAMPLE 4

Floats to which boats are tied are often supported by Styrofoam material partially submerged in the water. Diesel fuel, gasoline and oil slicks floating on the surface of the water cause deterioration of the Styrofoam material.

Use of the formula in Example 1 dispersed the gas and oil slicks. Inspection over a period of a year showed that by dispersing the gas and oil slicks the formula protected the Sytrofoam material and no sign of deterioration was noted.

EXAMPLE 5

The composition of Example 1 was added to the dirty bilge water in a boat at the rate of three ounces of composition to one yard of surface area of the water in the bilge. The treated water remained in the bilge for six hours and was then released. Later inspection of the bilge showed that unwanted oil had been removed successfully from the bilge of the boat. The released bilge water left no noticeable oil slick.

EXAMPLE 6

Example 5 was repeated except that ocean water was first pumped into the bilge to add to the dirty bilge water. The extra water raised the level in the bilge so as to enable the bilge water to reach all parts of the boat when the boat bobbed and rolled in moderate seas. After six hours of bobbing and rolling in moderate seas, one-half of the water in the bilge was released. Inspection of the bilge showed that the relatively inaccessible places in the bilge were cleaned. Sufficient amount of the composition was left in the bilge to prevent traces of oil appearing in the bilge.

EXAMPLE 7

Periodic oil slicks resulting from careless dumping of automobile crank case oil into a storm drain which led into a cove were dispersed when the composition of Example 1 was used. This occurred several times over the course of the year and each time the oil slick was completely dispersed.

A similar test was performed using a very heavy oil slick which was created using Gulf E.P. 145. This also was dispersed to the extent that no sign of oil could be visually noticed.

EXAMPLE 8

Oil was placed on the surface of the water contained in a perforated fish trap containing fish and clams. The composition of Example 1 was sprayed on the water having the oil coating in an amount sufficient to disperse the oil. This was repeated approximately once a month for a year. At the end of a calendar year the fish and clam colony were found to be alive.

The above examples have illustrated how the composition of this invention can be used to clean bilges of boats and to disperse oil slicks. The beneficial properties of the composition are evident, namely the safety of the composition when used in the presence of wildlife, the ability of the composition to protect metal and/or metal fastenings and Styrofoam from corrosion and deterioration, and its ability to clean bilges with little effort.

We claim:

1. A bilge cleaner comprised of from about 0.2 to 0.6 part of tetrasodium pyrophosphate to 1 part sulfonate wherein the sulfonate consists essentially of from about 20 to 90 percent by weight of an alkylolamide alkyl aryl sulfonate represented by the formula

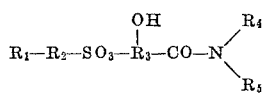

wherein:

$R_1$ is a linear alkyl group of from about 9 to 18 carbon atoms;

$R_2$ is an aryl group selected from the group consisting of benzene and naphthalene;

$R_3$ is an alkyl group of from 1 to 6 carbon atoms, and $R_4$ and $R_5$ are selected from the group consisting of hydrogen and methyl;

and the remainder of the sulfonate is monobutylbiphenyl sodium monosulfonate.

2. The bilge cleaner of claim 1 wherein the bilge cleaner consists essentially of 1.5 to 3.0 percent by weight of tetrasodium pyrophosphate, of from about 5 to 7 percent by weight sulfonate, and the remainder of water.

3. A bilge cleaner as in claim 2 wherein the sulfonate consists essentially of from about 40 to 70 percent by weight alkylolamide alkyl aryl sulfonate and the remainder monobutylbiphenyl sodium monosulfonate.

4. A bilge cleaner of claim 2 wherein the tetrasodium pyrophosphate is present in an amount ranging from 1.5 to 2.5 percent by weight and the sulfonate is present in an amount ranging from 5.8 to 6.0 percent by weight.

5. A bilge cleaner of claim 1 wherein $R_1$ is an alkyl group of from about 12 to 14 carbon atoms, wherein $R_2$ is benzene, wherein $R_3$ is an alkyl group of 1 to 3 carbon atoms, and wherein $R_4$ and $R_5$ are hydrogen atoms.

References Cited

UNITED STATES PATENTS

| | | | |
|---|---|---|---|
| 2,740,814 | 4/1956 | Cross et al. | 252—355 X |
| 2,673,841 | 3/1954 | Reinhard | 252—539 X |
| 2,573,599 | 10/1951 | Price | 252—312 |
| 3,012,975 | 12/1961 | Lambert | 252—352 |
| 3,192,166 | 6/1965 | Smith | 252—539 X |

RICHARD D. LOVERING, Primary Examiner

U.S. Cl. X.R.

210—DIG 21; 252—2, 8.05, 312, 352, 355, 389, 545